United States Patent
Kusanagi et al.

(10) Patent No.: US 10,757,315 B2
(45) Date of Patent: Aug. 25, 2020

(54) VEHICLE IMAGING SUPPORT DEVICE, METHOD, AND PROGRAM STORAGE MEDIUM

(71) Applicant: Toyota Jidosha Kabushiki Kaisha, Toyota-shi, Aichi-ken (JP)

(72) Inventors: Daichi Kusanagi, Toyota (JP); Masaki Ito, Toyota (JP); Kenta Miyahara, Toyota (JP); Kihiro Kato, Tokoname (JP); Yuka Shidochi, Toyota (JP); Yohei Tanigawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/238,096

(22) Filed: Jan. 2, 2019

(65) Prior Publication Data
US 2019/0215437 A1   Jul. 11, 2019

(30) Foreign Application Priority Data
Jan. 11, 2018   (JP) .................................. 2018-002757

(51) Int. Cl.
| | |
|---|---|
| H04N 5/232 | (2006.01) |
| G06Q 50/00 | (2012.01) |
| H04W 4/02 | (2018.01) |
| H04N 7/18 | (2006.01) |
| G06T 7/73 | (2017.01) |
| H04W 4/021 | (2018.01) |

(52) U.S. Cl.
CPC ......... *H04N 5/23206* (2013.01); *G06Q 50/01* (2013.01); *G06T 7/73* (2017.01); *H04N 7/185* (2013.01); *H04W 4/021* (2013.01); *H04W 4/025* (2013.01)

(58) Field of Classification Search
CPC .... H04N 5/23206; H04N 7/185; G06Q 50/01; H04W 4/025; H04W 4/021; G06T 7/73
See application file for complete search history.

(56) References Cited

U.S. PATENT DOCUMENTS

| | | | | |
|---|---|---|---|---|
| 2008/0309763 | A1* | 12/2008 | Hongo ..................... | B60R 1/00 348/148 |
| 2013/0286206 | A1 | 10/2013 | Ozaki et al. | |
| 2015/0073705 | A1* | 3/2015 | Hiwatashi ............... | G01S 19/48 701/468 |
| 2015/0126225 | A1 | 5/2015 | Endo et al. | |
| 2016/0094793 | A1* | 3/2016 | Westmacott ....... | H04N 5/23296 348/159 |
| 2017/0293297 | A1* | 10/2017 | Kim ....................... | G08C 17/02 |

FOREIGN PATENT DOCUMENTS

| | | |
|---|---|---|
| JP | 2008-225777 A | 9/2008 |
| JP | 2013-231655 A | 11/2013 |
| JP | 5943222 B2 | 6/2016 |

* cited by examiner

*Primary Examiner* — Padma Haliyur
(74) *Attorney, Agent, or Firm* — Dinsmore & Shohl LLP

(57) ABSTRACT

A vehicle imaging support device includes: an identification unit that is configured to identify an imaging device that is able to image a vehicle in a driving state from outside, based on a position of the vehicle; a instruction unit that is configured to instructs the imaging device identified by the identification unit, to capture an image of the vehicle in the driving state; and an acquisition unit that obtains the image captured by the imaging device in response to the instruction from the instruction unit.

15 Claims, 14 Drawing Sheets

| CAMERA ID | INSTALLATION LOCATION |
|---|---|
| Cm1 | LATITUDE, LONGITUDE, ALTITUDE (Sp1) |
| Cm2 | LATITUDE, LONGITUDE, ALTITUDE (Sp2) |
| Cm3 | LATITUDE, LONGITUDE, ALTITUDE (Sp3) |
| Cm4 | LATITUDE, LONGITUDE, ALTITUDE (Sp4) |
| ... | ... |

| USER NAME | USER ID | NUMBER | VEHICLE MODEL | E-MAIL ADDRESS |
|---|---|---|---|---|
| ICHIRO XX | A1 | 豊田 99X き 8691 | XXX | abc@... |
| JIRO YY | B2 | 豊田 99Y ら 8612 | YYY | def@... |
| HANAKO XY | C3 | 豊田 99Z く 8643 | ZZZ | ghi@... |
| SABURO YX | D4 | 豊田 99W す 8664 | WWW | jkl@... |
| ... | ... | ... | ... | ... |

FIG.8

| PATTERN ID | EDITING CONTENTS | | |
|---|---|---|---|
| | FIELD ANGLE | ANGLE | REPRODUCTION SPEED |
| P1 | G11 | A11 | Pb1 |
| P2 | G12 | A12 | Pb2 |
| P3 | G13 | A13 | Pb3 |
| ... | ... | ... | ... |

FIG.12

IMAGING REQUEST SCREEN

USER ID

PRESENT POSITION

EDITING ☐ YES ☐ NO

EDIT MENU

☐ P1 (THIS EDIT PATTERN IS ⋯)

☐ P2 (...)

☐ P3 (...)

⋮

SEND    CANCEL

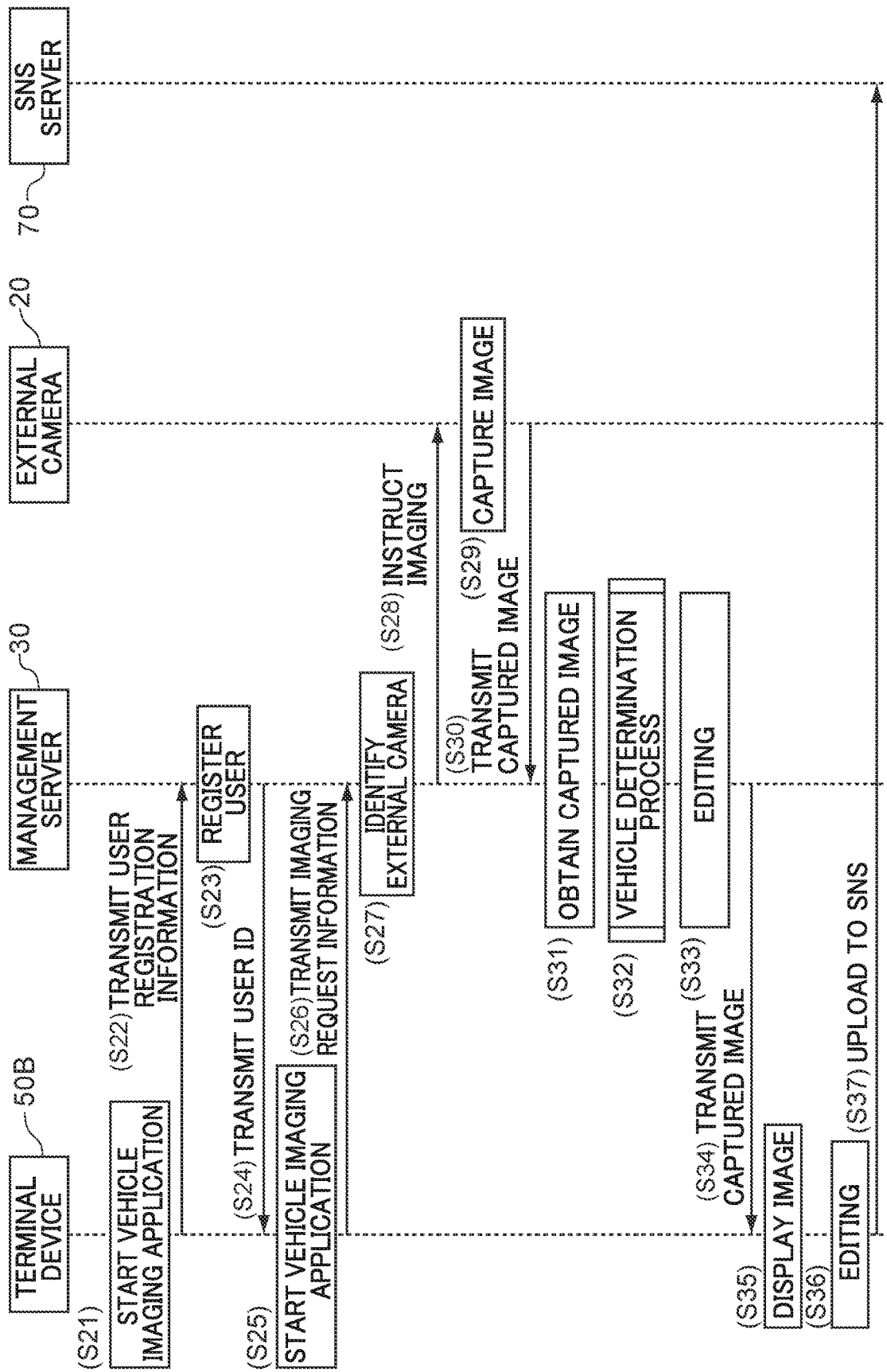

VEHICLE IMAGING SUPPORT DEVICE, METHOD, AND PROGRAM STORAGE MEDIUM

CROSS-REFERENCE TO RELATED APPLICATION

This application is based on and claims priority under 35 USC 119 from Japanese Patent Application No. 2018-002757 filed on Jan. 11, 2018, the disclosure of which is incorporated by reference herein.

BACKGROUND

Technical Field

The present disclosure relates to a vehicle imaging support device, method, and program storage medium.

Related Art

In recent years, with the popularization of mobile terminal devices, such as smart phones and tablet computers, social networking service (hereinafter referred to as SNS) including LINE®, Twitter®, Facebook®, Instagram®, and the like is frequently used.

Information posted to the SNS may be used in vehicle-mounted devices, such as car navigation systems. For example, Japanese Patent Application Laid-Open No. 2013-231655 describes a technology in which, with the use of a mobile device and a vehicle-mounted device, a user who looks at the vehicle-mounted device may intuitively grasp a posting location of posted information acquired by the mobile device. The above mobile device acquires the information posted to the SNS. Based on the posting location of the acquired posted information, the position of a vehicle, and an optical axis direction of a camera, the mobile device generates an augmented reality image by superimposing an icon that indicates the presence of the information posted in a region that the camera may image, and transmits the generated augmented reality image to the vehicle-mounted device. The vehicle-mounted device displays the received augmented reality image on a display screen.

In this regard, drivers who like driving desire to post images of their vehicles' appearance during driving, in order to show the images to many people. However, it is difficult for the drivers to capture images of their vehicles' appearance during driving. Even if the drivers ask their friends or the like to capture the images of their vehicles' appearance during driving, it is not easy for these friends to finely capture the images of the vehicles' appearance during driving, because it requires a certain degree of imaging skill.

SUMMARY

The present disclosure is implemented under the circumstances described above, and provides a vehicle imaging support device, method, and program storage medium that may obtain an image of a driving vehicle captured from outside, without requiring any photographers.

According to a first aspect of the present disclosure, a vehicle imaging support device includes an identification unit that is configured to identify an imaging device that is able to image a vehicle in a driving state from outside, based on a position of the vehicle; a instruction unit that is configured to instruct the imaging device identified by the identification unit, to capture an image of the vehicle in the driving state; and an acquisition unit that is configured to obtain the image captured by the imaging device in response to the instruction from the instruction unit.

According to the first aspect, the use of the imaging device that is identified based on the position of the driving vehicle allows capturing the image of the vehicle in the driving state.

The first aspect may further include an uploading unit that is configured to upload the captured image obtained by the acquisition unit to a predetermined social networking service.

According to the above configuration, since the captured image of the driving vehicle is uploaded to the SNS, many SNS users may view the captured image.

The first aspect may further include a determination unit that is configured to determine whether or not the vehicle is present in the captured image obtained by the acquisition unit, and the uploading unit may be configured to upload the captured image to the social networking service in a case in which the determination unit has determined that the vehicle is present in the captured image.

According to the above configuration, it is possible to prevent posting of an image in which the vehicle is absent, to the SNS.

In the first aspect, the determination unit may be configured to determine that the vehicle is present in the captured image in a case in which a number of a license plate of the vehicle is present in the captured image obtained by the acquisition unit.

According to the above configuration, it is possible to determine whether or not the vehicle is present in the captured image, by a well-known simple image recognition technique.

The first aspect may further include an edit unit that is configured to perform an editing process on the captured image obtained by the acquisition unit.

According to the above configuration, it is possible to obtain a vehicle image that is edited in accordance with a user's preference or the like.

According to the first aspect, the captured image may be a moving image, and the editing process may include editing at least one value of a field angle, an angle, or a reproduction speed of the moving image.

According to the above configuration, it is possible to obtain a vehicle image in which at least one of the field angle, the angle, or the reproduction speed of the moving image is edited in accordance with a user's preference or the like.

In the first aspect, the identification unit may be configured to identify the position of the vehicle by receiving a position of a terminal device that has been carried onto the vehicle and that is able to identify the position of the terminal device itself.

According to the above configuration, the position of the vehicle may be identified without an additional cost.

The first aspect may further include a presentation unit that is configured to present guide information to a location at which the imaging device identified by the identification unit is installed.

According to the above configuration, the imaging may be more reliably performed using the identified imaging device.

A second aspect of the present disclosure is A non-transitory storage medium storing a program to cause a computer to execute a vehicle imaging support process, the vehicle imaging support process includes: identifying an imaging device that is able to image a vehicle in a driving state from outside, based on a position of the vehicle;

instructing the identified imaging device to capture an image of the vehicle in the driving state; and obtaining the image captured by the imaging device in response to the instruction.

According to the second aspect, as in the case of the first aspect, the use of the imaging device that is identified based on the position of the driving vehicle allows easily capturing the image of the vehicle in the driving state.

A third aspect of the present disclosure is a vehicle imaging support method that includes: identifying an imaging device that is able to image a vehicle in a driving state from outside, based on a position of the vehicle; instructing the identified imaging device to capture an image of the vehicle in the driving state; and obtaining the image captured by the imaging device in response to the instructing.

According to the third aspect, as in the cases of the first and second aspects, the use of the imaging device that is identified based on the position of the driving vehicle allows easily capturing the image of the vehicle in the driving state.

As described above, according to the present disclosure, it is possible to obtain the image of the vehicle in the driving state, viewed from outside, without need of any photographers.

BRIEF DESCRIPTION OF THE DRAWINGS

FIG. 8 is a drawing illustrating an example of an edit pattern table according to the embodiments;

FIG. 12 is a front view illustrating an example of an imaging request screen according to the embodiments;

FIG. 15 is a sequence diagram illustrating an example of a process flow performed by a vehicle imaging support processing program and a vehicle imaging application program according to the second embodiment.

DETAILED DESCRIPTION

Examples of embodiments of the present disclosure will be described below in detail with reference to the drawings.

First Embodiment

Figure 1:
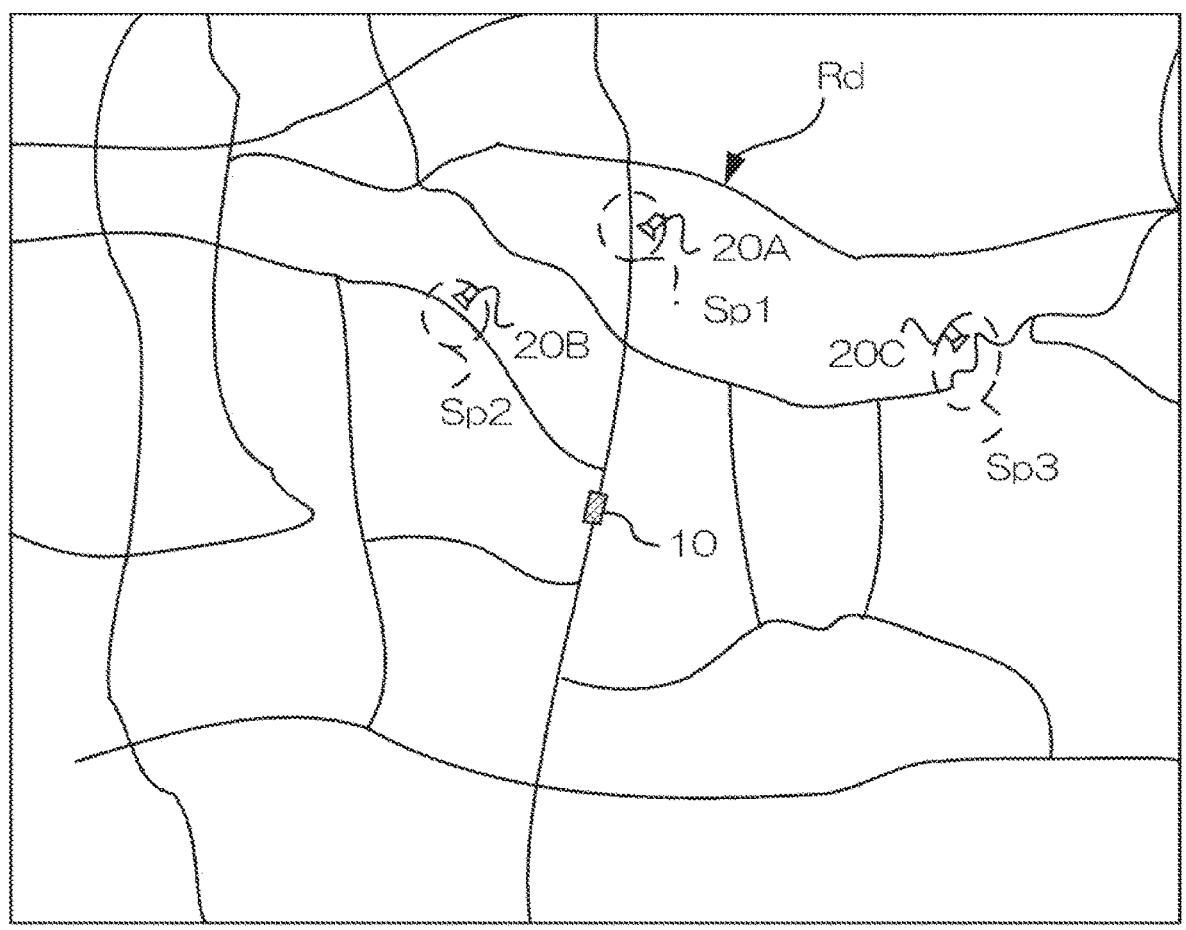
FIG. 1 is a drawing illustrating an example of plural imaging spots according to embodiments.

FIG. 1 is a drawing illustrating an example of plural (three in this embodiment) imaging spots Sp1 to Sp3 according to the embodiments.

As illustrated in FIG. 1, many specific locations (for example, corners of slaps and mountain roads and the like) that are popular among users who like driving exist on roads Rd on which a vehicle 10, such as a car or a motorcycle, may travel. These specific locations suitable for imaging of vehicles are designated as imaging spots Sp1 to Sp3.

One or more external cameras 20A are provided at the imaging spot Sp1. The external camera 20A is disposed so as to be able to image the vehicle 10 driving on the road Rd at the imaging spot Sp1. In the same manner, one or more external cameras 20B are provided at the imaging spot Sp2, and one or more external cameras 20C are provided at the imaging spot Sp3.

For the sake of simplicity of explanation, three imaging spots are present in this embodiment. However, the number of imaging spots is not limited to three, as long as there are one or more imaging spots. The imaging spots Sp1 to Sp3 are hereinafter also generically referred to as imaging spots Sp, when there is no necessity to distinguish between the imaging spots Sp1 to Sp3. In the same manner, the external cameras 20A to 20C are also generically referred to as external cameras 20, when there is no necessity to distinguish between the external cameras 20A to 20C. Note that, the external camera 20 is an example of an imaging device.

Figure 2:
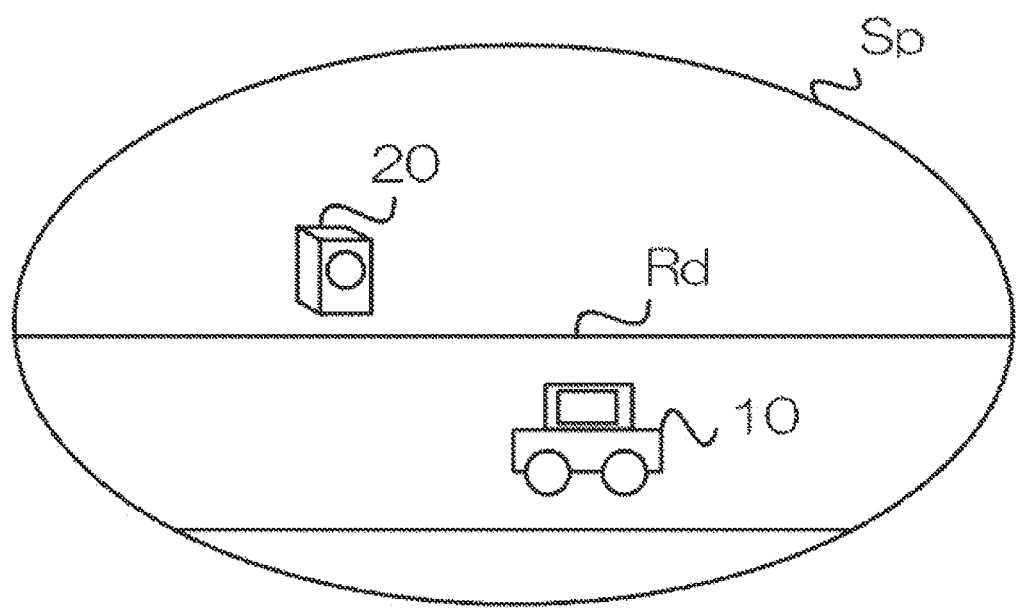
FIG. 2 is a drawing illustrating an example of a state in which a vehicle is driving on a road provided with the imaging spot according to the embodiments.

FIG. 2 is a drawing illustrating an example of a state in which the vehicle 10 is driving on the road Rd provided with the imaging spot Sp according to the embodiments.

In the first embodiment, as illustrated in FIG. 2, a case in which a vehicle imaging service is provided will be described. The vehicle imaging service provides an occupant of the vehicle 10 with a captured image of the vehicle 10 driving on the road Rd at the imaging spot Sp, using the external camera 20. Note that, in the first embodiment, a moving image is applied as the captured image, but the disclosure is not limited thereto and a static image may be applied instead.

Figure 3:
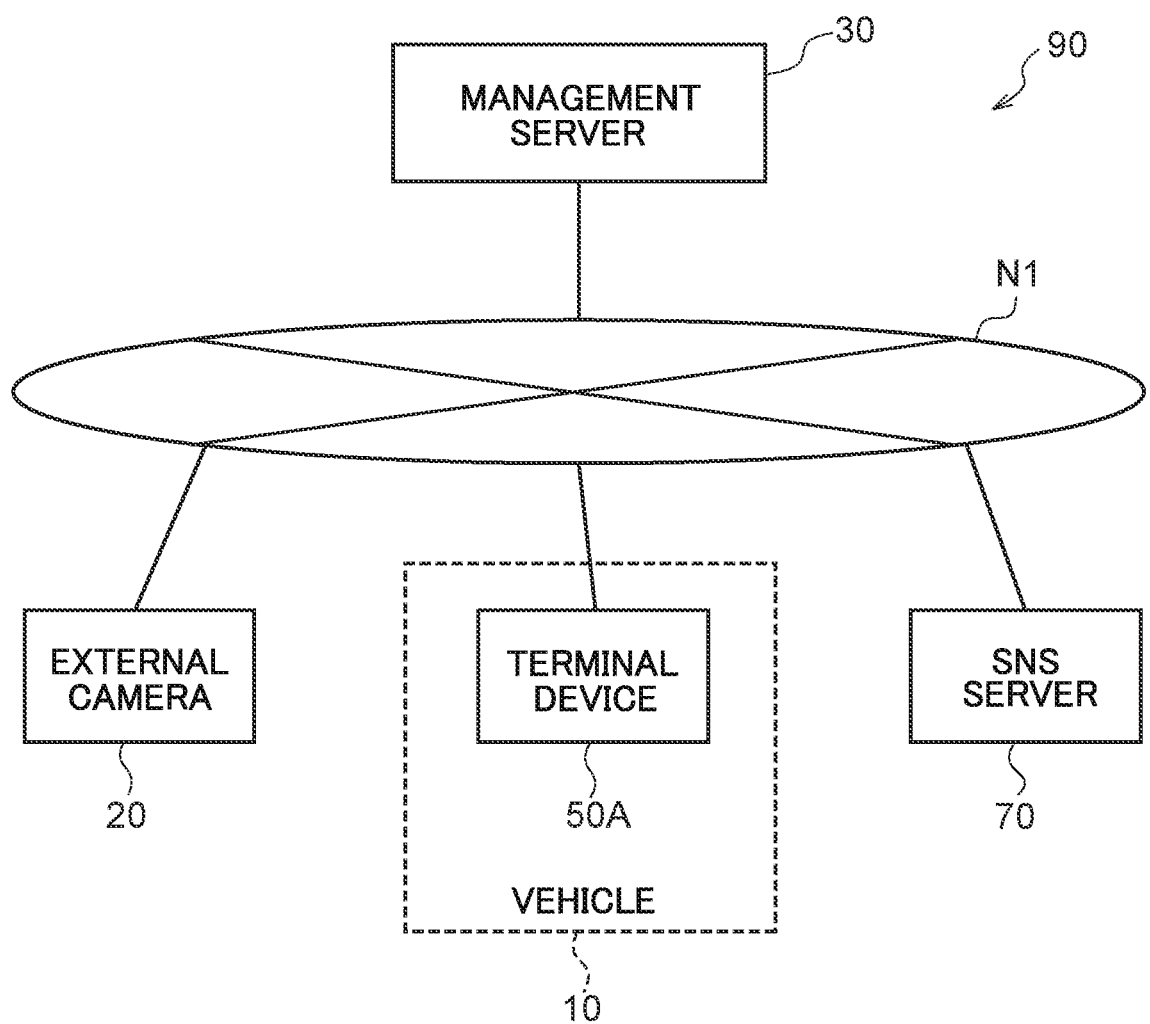
FIG. 3 is a block diagram illustrating an example of the configuration of a vehicle imaging system according to the embodiments.

Referring to FIG. 3, a vehicle imaging system that provides the vehicle imaging service will be first described in detail.

FIG. 3 is a block diagram illustrating an example of the configuration of a vehicle imaging system 90 according to the embodiments.

As illustrated in FIG. 3, the vehicle imaging system 90 includes a management server 30, the external cameras 20, and a terminal device 50A.

The management server 30 is for example a server computer, and is an example of a vehicle imaging support device. The management server 30 is connected to each of the external cameras 20 and the terminal device 50A through a network N. The management server 30 and the terminal device 50A are also connected to an SNS server 70 that is managed by a service provider providing predetermined SNS. The network N1 includes, for example, the Internet, a wide area network (WAN), or the like.

The terminal device 50A is installed in the vehicle 10. For example, a mobile terminal device, such as a smart phone or a tablet computer that the occupant of the vehicle 10 possesses, a car navigation device that is stationarily installed in the vehicle 10, or the like may be applied as the terminal device 50A. The terminal device 50A has the function of identifying the position of its own device, (that is, a global positioning system (OPS) function in this embodiment).

As the external camera 20, a specific camera for use in the vehicle imaging service or a stationary camera, such as a security camera or a weather monitoring camera, may be used. The installation location of the external camera 20 is not limited to the specific imaging spot, but may be a specific vehicle that is prepared in advance for use in the vehicle imaging service, a friend's vehicle, or the like.

Figure 4:
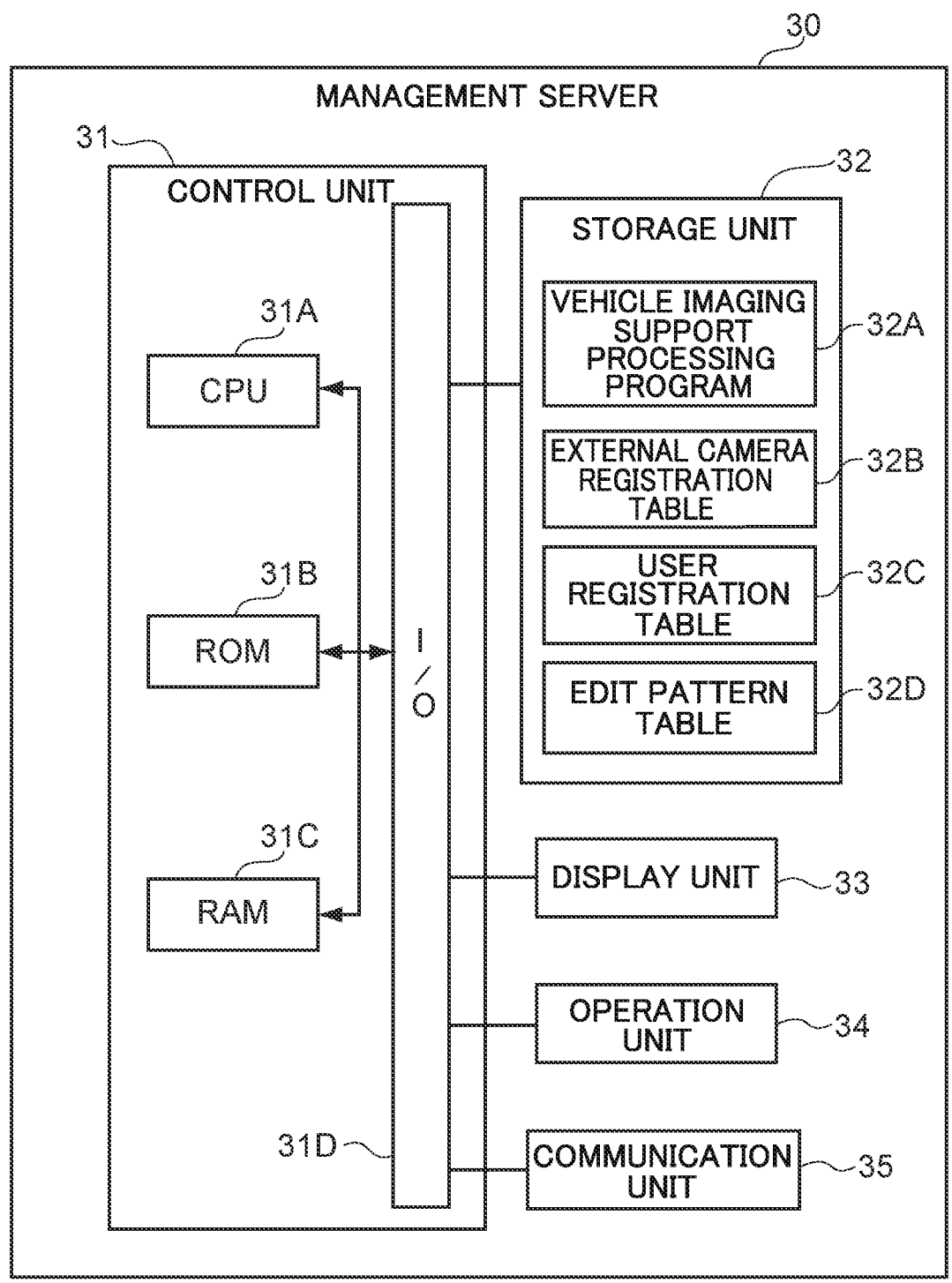
FIG. 4 is a block diagram illustrating an example of the electrical configuration of a management server according to the embodiments.

FIG. 4 is a block diagram illustrating an example of the electrical configuration of the management server 30 according to the embodiments. As illustrated in FIG. 4, the management server 30 includes a control unit 31, a storage unit 32, a display unit 33, an operation unit 34, and a communication unit 35.

The control unit 31 includes a central processing unit (CPU) 31A, a read only memory (ROM) 31B, a random access memory (RAM) 31C, and an input and output interface (I/O) 31D. These components are each connected through a bus.

Functional units, including the storage unit 32, the display unit 33, the operation unit 34, and the communication unit 35, are connected to the I/O 31D. Each of the functional units are able to be mutually communicated with the CPU 31A through the I/O 31D.

The control unit 31 may be configured as a sub controller that controls the operation of a part of the management server 30, or may be configured as a part of a main controller that controls the overall operation of the management server 30. For example, an integrated circuit, such as a large scale integration (LSI), or an integrated circuit (IC) chip set is used for configuring a part or the whole blocks of the control unit 31. A separate circuit or a partially or entirely integrated circuit may be used for configuring each of the blocks. All of the blocks may be integrated, or a part of the blocks may be separately provided. Alternatively, a part of each of the blocks may be separately provided. A specific circuit or a general-purpose processor may be used for integrating the control unit 31, instead of the LSI.

For example, a hard disk drive (HDD), a solid state drive (SSD), a flash memory, or the like may be used as the storage unit 32. The storage unit 32 stores a vehicle imaging support processing program 32A to perform a vehicle imaging support process. Note that, the vehicle imaging support processing program 32A may be alternatively stored in the ROM 31B The storage unit 32 further stores an external camera registration table 32b, a user registration table 32C, and an edit pattern table 32D.

The vehicle imaging support processing program 32A may be installed in advance in, for example, the management server 30. Alternatively, the vehicle imaging support processing program 32A may be distributed in a state of being stored in a nonvolatile storage medium or through the network N1, and appropriately installed in the management server 30. Examples of the nonvolatile storage medium includes a compact disc read only memory (CD-ROM), a magneto-optical disk, a HDD, a digital versatile disc read only memory (DVD-ROM), a flash memory, a memory card, and the like.

For example, a liquid crystal display (LCD), an organic electroluminescence (EL) display, or the like may be used as the display unit 33. The operation unit 34 is provided with an operation key group to receive various types of instructions from an operator of the management server 30. The communication unit 35 is connected to the network N1. The communication unit 35 communicates with each of the external cameras 20, the terminal device 50A, and the SNS server 70 through the network N1.

Figure 5:
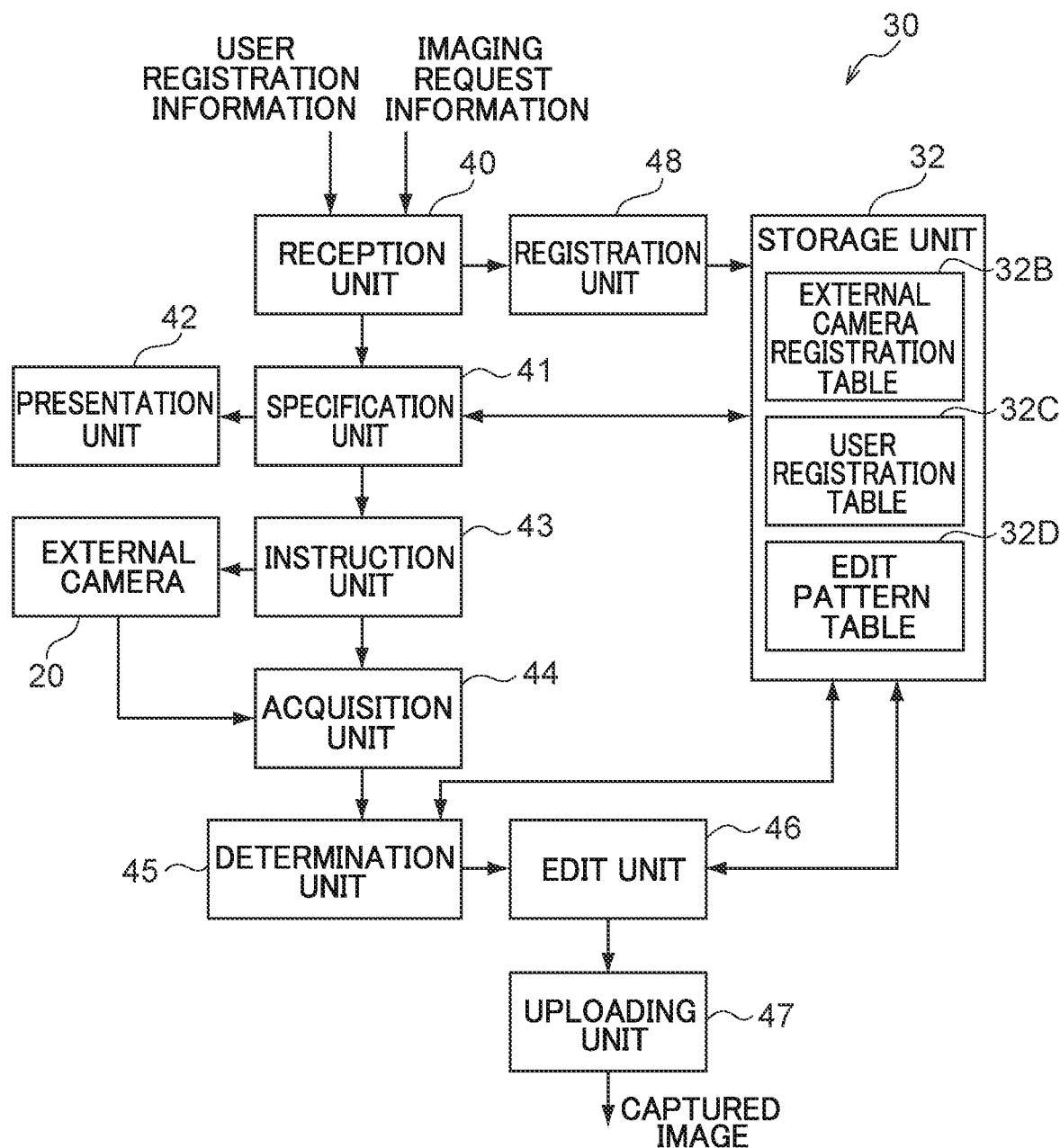
FIG. 5 is a block diagram illustrating an example of the functional configuration of the management server according to the embodiments.

The CPU 31A of the management server 30 loads the vehicle imaging support processing program 32A stored in the storage unit 32 to the RAM 31C, and executes the vehicle imaging support processing program 32A, so that the CPU 31A functions as each unit illustrated in FIG. 5.

FIG. 5 is a block diagram illustrating an example of the functional configuration of the management server 30 according to the embodiments. As illustrated in FIG. 5, the CPU 31A of the management server 30 functions as a reception unit 40, an identification unit 41, a presentation unit 42, a instruction unit 43, an acquisition unit 44, a determination unit 45, an edit unit 46, a uploading unit 47, and a registration unit 48, by executing the vehicle imaging support processing program 32A.

Figure 6:
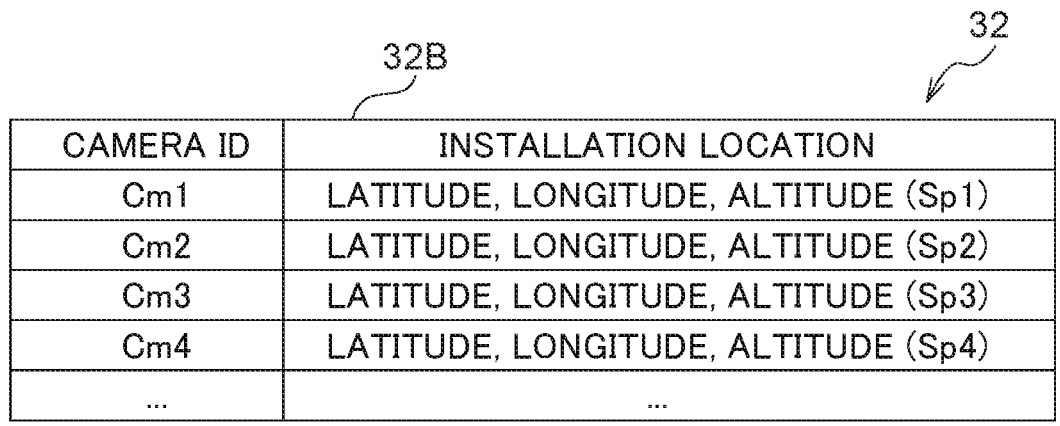
FIG. 6 is a drawing illustrating an example of an external camera registration table according to the embodiments.

FIG. 6 is a drawing illustrating an example of the external camera registration table 32B. As illustrated in FIG. 6, the external camera registration table 32B of the first embodiment stores camera identifications (IDs) that are used to identify the external cameras, including the external cameras 20, and information about installation positions of the external cameras, in association with each other. For example, information represented by a latitude, a longitude, and an altitude of the installation position of the external camera may be used as the information indicating the installation position of the external camera.

Figure 7:
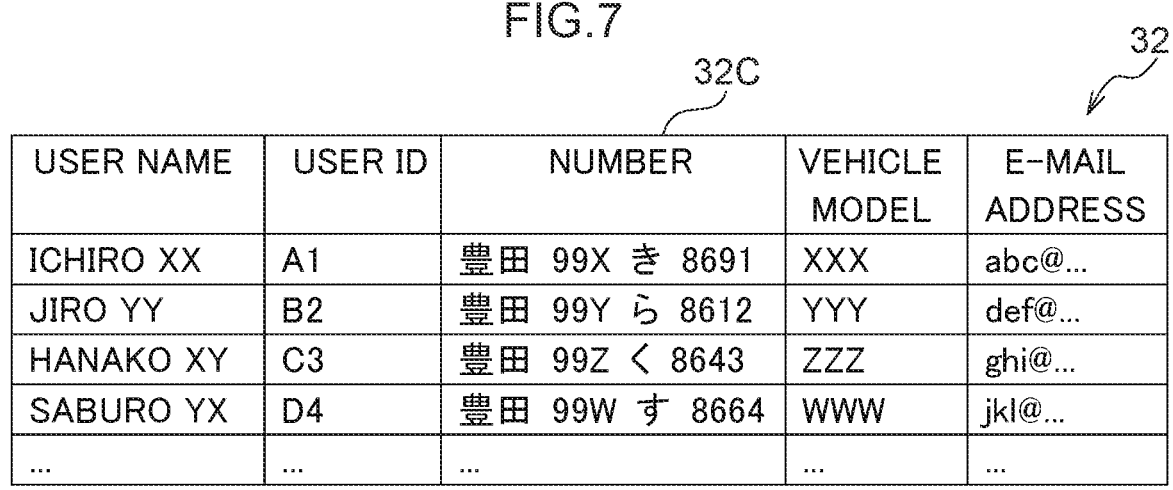
FIG. 7 is a drawing illustrating an example of a user registration table according to the embodiments.

FIG. 7 is a drawing illustrating an example of the user registration table 32C according to the embodiments. As illustrated in FIG. 7, the user registration table 32C of the first embodiment stores user names representing occupants of vehicles, user IDs for identifying the occupants of the vehicles, numbers (registration numbers or vehicle numbers) of license plates of the vehicles, models of the vehicles, and E-mail addresses of the occupants, in association with each other.

FIG. 8 is a drawing illustrating an example of the edit pattern table 32D according to the embodiments. The edit pattern table 32D is a table that is used in an editing process of images captured by the external cameras. As illustrated in FIG. 8, the edit pattern table 32D stores pattern IDs used for identifying edit patterns, set values of field angles (i.e., fields of view), set values of angles (shooting angles), and set values of reproduction speeds, in association with each other. Note that, a field angle is a parameter for setting an imaging range. An angle is a parameter for setting an imaging or shooting angle with respect to an object. A reproduction speed is a parameter for setting a speed at which a moving image is reproduced.

Referring to FIGS. 5 to 8, each of the functional units of the management server 30, as illustrated in FIG. 5, will be described below.

The reception unit 40 receives an input of user registration information from the terminal device 50A installed in the vehicle 10 through the network N1. The user registration information includes a user name representing the occupant of the vehicle, a number of a license plate of the vehicle, a model of the vehicle, and an E-mail address of the occupant.

The registration unit 48 registers the user registration information, received the input from the reception unit 40, into the user registration table 32C illustrated in FIG. 7, for example. At this time, the registration unit 48 generates a user ID, which is used for identifying a user, for the user registration information. The registration unit 48 registers the generated user ID into the user registration table 32C, and transmits the user ID to the terminal device 50A through the network N1. This user registration allows the user to make an imaging request using his or her user ID.

The reception unit 40 also receives an input of imaging request information, which is described later, from the terminal device 50A installed in the vehicle 10. The imaging request information includes a user ID, a present position, editing on a captured image, and a pattern ID in the case of editing is needed.

The identification unit 41 identifies the external camera 20 that is able to image the driving vehicle 10 from outside, based on the position of the vehicle 10 received from the reception unit 40. Specifically, the identification unit 41 refers to, for example, the external camera registration table 32B illustrated in FIG. 6, and identifies the external camera 20 that corresponds to the nearest imaging spot Sp to the position of the vehicle 10, based on the present position of the vehicle 10 included in the imaging request information. Note that, the identification unit 41 may select, from the external camera registration table 32B illustrated in FIG. 6, plural imaging spots Sp that are located in a predetermined range based on the present position of the vehicle 10, and may prompt the occupant of the vehicle 10 to identify a desired imaging spot Sp, among the selected plural imaging spots Sp. In this case, the identification unit 41 identifies the external camera 20 corresponding to the imaging spot Sp identified by the occupant of the vehicle 10, as an external camera that is able to image the driving vehicle 10 from outside.

The presentation unit 42 provides guide information to the location of the external camera 20 identified by the identification unit 41. Specifically, the presentation unit 42 transmits the guide information to the terminal device 50A through the network N1, and the terminal device 50A presents the guide information. The guide information described here includes, for example, route information for guiding the vehicle 10 from the present position to the location of the imaging spot Sp. As a presentation form of the guide information, a form that is easily understandable for a driver is preferable, such that, for example, presenting a route on a map, or navigating the route by a voice.

The instruction unit 43 instructs the external camera 20, identified by the identification unit 41, to capture an image of the vehicle 10 in a driving state. Note that, the time of instructing a start of the imaging may be, for example, a time when the vehicle 10 enters an imaging region of the identified external camera 20. The imaging automatically ends at the time when the vehicle 10 moves out of the imaging region of the identified external camera 20. Note that, the reception unit 40 receives positions of the vehicle 10 in time series, from the time of receiving the imaging request for the vehicle 10. The imaging region that may be imaged by each of the external cameras is registered in advance in the external camera registration table 32B illustrated in FIG. 6. Whether or not the vehicle 10 enters the imaging region of the external camera 20, and whether or not the vehicle 10 moves out of the imaging region may be thereby determined based on the positions of the vehicle 10.

The acquisition unit 44 obtains the image that is captured by the external camera 20 in response to the instruction from the instruction unit 43. The acquisition unit 44 stores the obtained captured image and the user ID, which is included in the imaging request information, in the storage unit 32 in association with each other.

The determination unit 45 determines whether or not the vehicle 10 is present in the captured image obtained by the acquisition unit 44. For example, when a number of the license plate of the vehicle 10 is present in the captured image, the determination unit 45 determines that the vehicle 10 is present in the captured image. Specifically, the determination unit 45 reads out a number that corresponds to the user ID included in the imaging request information from, for example, the user registration table 32C illustrated in FIG. 7, and determines whether or not the read number is present in the captured image. A well-known image recognition technique may be used for this determination of the number of the vehicle 10.

The edit unit 46 performs an editing process of the captured image in which the determination unit 45 has determined that the vehicle 10 is present. Specifically, the edit unit 46 reads out editing contents that correspond to the pattern ID included in the imaging request information from, for example, the edit pattern table 32D illustrated in FIG. 8, and edits the captured image based on the read editing contents. In the first embodiment, the captured image is a moving image, and the editing process is performed based on the set values of the field angle, the angle, and the reproduction speed of the moving image. However, the editing process may be performed using any one or two set values of the field angle, the angle, or the reproduction speed of the moving image. When editing the field angle and the angle of the moving image, an image interpolation process may be preferably performed as necessary. When "no edit" is designated in the imaging request information, no editing process is performed.

The uploading unit 47 performs a process of uploading (posting) the captured image received from the edit unit 46 to the SNS server 70 through the network N1. The uploading unit 47 performs a process of transmitting the captured image received from the edit unit 46 to the terminal device 50A through the network N1. The E-mail address of the occupant of the vehicle 10 is set in advance in the terminal device 50A, and the uploading unit 47 reads the E-mail address of the occupant from, for example, the user registration table 32C illustrated in FIG. 7. When the captured image is uploaded to the SNS server 70, an SNS account of the occupant of the vehicle 10 is registered in advance into the user registration table 32C illustrated in FIG. 7.

Note that, although in the first embodiment, the uploading unit 47 is configured to upload the captured image, in which the determination unit 45 determines that the vehicle 10 is present, to the SNS server 70, the determination unit 45 may not be configured to perform the vehicle determination. In this case, the captured image obtained by the acquisition unit 44 is transmitted to the uploading unit 47 through the edit unit 46, regardless of whether or not the vehicle 10 is present in the captured image.

Next, the terminal device 50A according to the first embodiment will be specifically described with reference to FIGS. 9 and 10.

Figure 9:
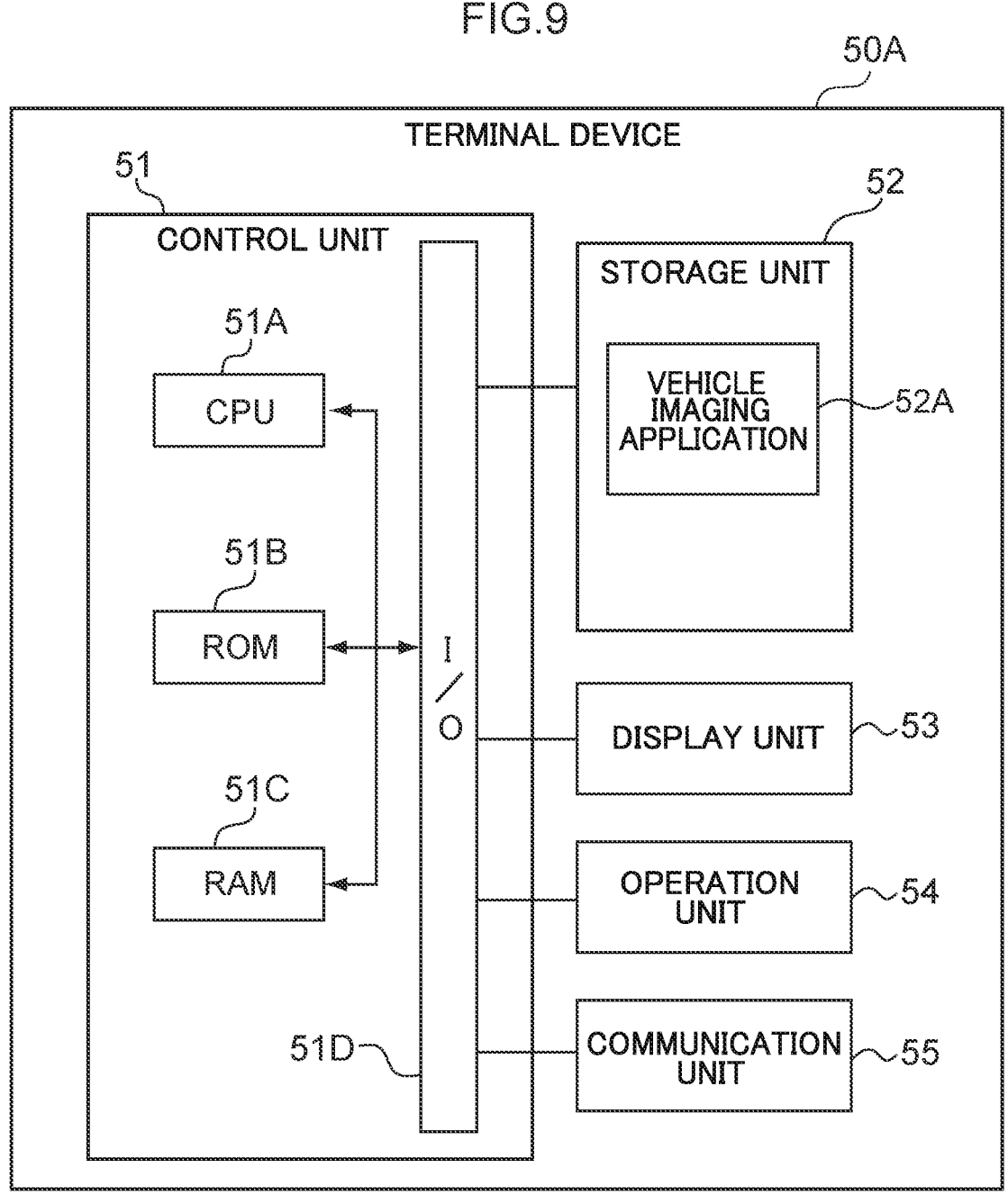
FIG. 9 is a block diagram illustrating an example of the electrical configuration of a terminal device according to a first embodiment.

FIG. 9 is a block diagram illustrating an example of the electrical configuration of the terminal device 50A according to the first embodiment. As illustrated in FIG. 9, the terminal device 50A includes a control unit 51, a storage unit 52, a display unit 53, an operation unit 54, and a communication unit 55.

The control unit 51 includes a CPU 51A, a ROM 51B, a RAM 51C, and an I/O 1D, which are each connected through a bus.

Functional units, including the storage unit 52, the display unit 53, the operation unit 54, and the communication unit 55, are connected to the I/O 51D. Each of the functional units may be mutually communicated with the CPU 51A through the I/O 51D.

For example, an SSD (solid state drive), a flash memory, or the like may be used as the storage unit 52. The storage unit 52 stores a vehicle imaging application 52A for using the vehicle imaging service according to the first embodiment. The vehicle imaging application 52A may be obtained from, for example, the management server 30 that provides the vehicle imaging service, by downloading.

As the display unit 53, for example, a liquid crystal display (LCD), an organic EL (electroluminescence) display, or the like may be used. The operation unit 54 is provided with an operation key group to receive various types of instructions from an operator of the terminal device 50A. The communication unit 55 is connected to the network N1. The communication unit 55 communicates with each of the management server 30 and the SNS server 70 through the network N1.

The CPU 51A of the terminal device 50A loads the vehicle imaging application 52A, stored in the storage unit 52, to the RAM SIC, and executes the vehicle imaging application 52A. The CPU 51A thereby functions as each unit illustrated in FIG. 10.

Figure 10:
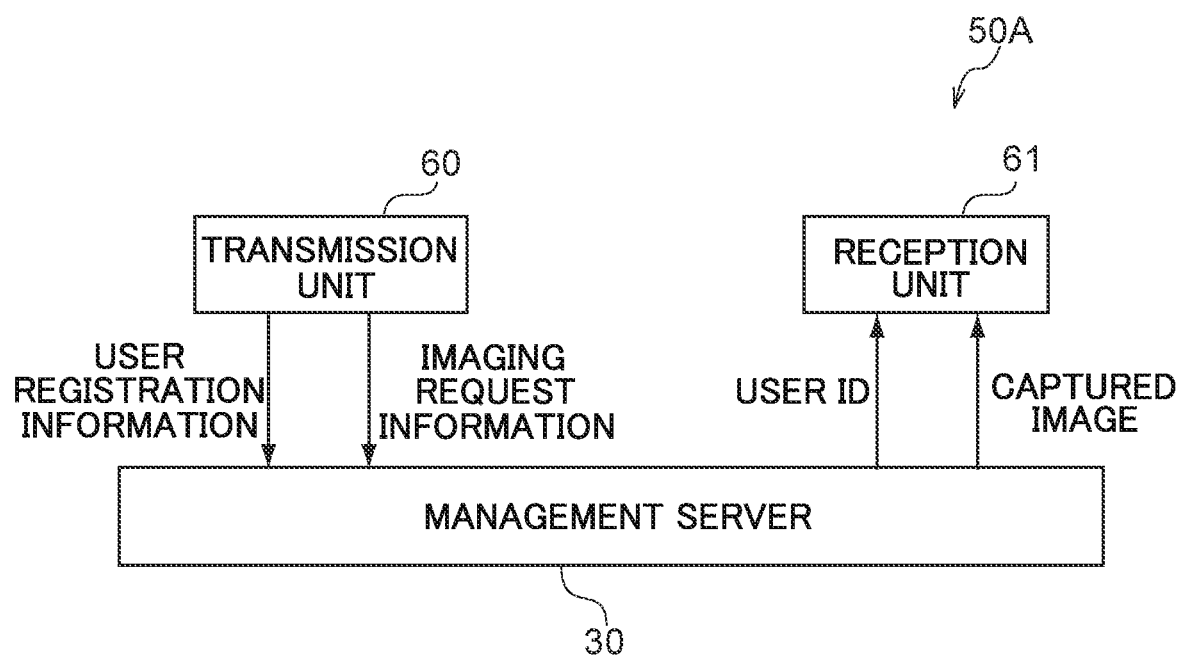
FIG. 10 is a block diagram illustrating an example of the functional configuration of the terminal device according to the first embodiment.

FIG. 10 is a block diagram illustrating an example of the functional configuration of the terminal device 50A according to the first embodiment. As illustrated in FIG. 10, the CPU 51A of the terminal device 50A functions as a transmission unit 60 and a reception unit 61, by executing the vehicle imaging application 52A.

In cases of registering an occupant of the vehicle 10 as a user, the transmission unit 60 transmits the user registration information to the management server 30 through the network N1. In this case, the reception unit 61 receives a user ID from the management server 30, which has accepted the input of the user registration information, through the network N1.

In cases of requesting imaging of the vehicle 10, the transmission unit 60 transmits the imaging request information to the management server 30 through the network N. In this case, the reception unit 61 receives a captured image from the management server 30, which has accepted the input of the imaging request information, through the network N1.

Figure 11:
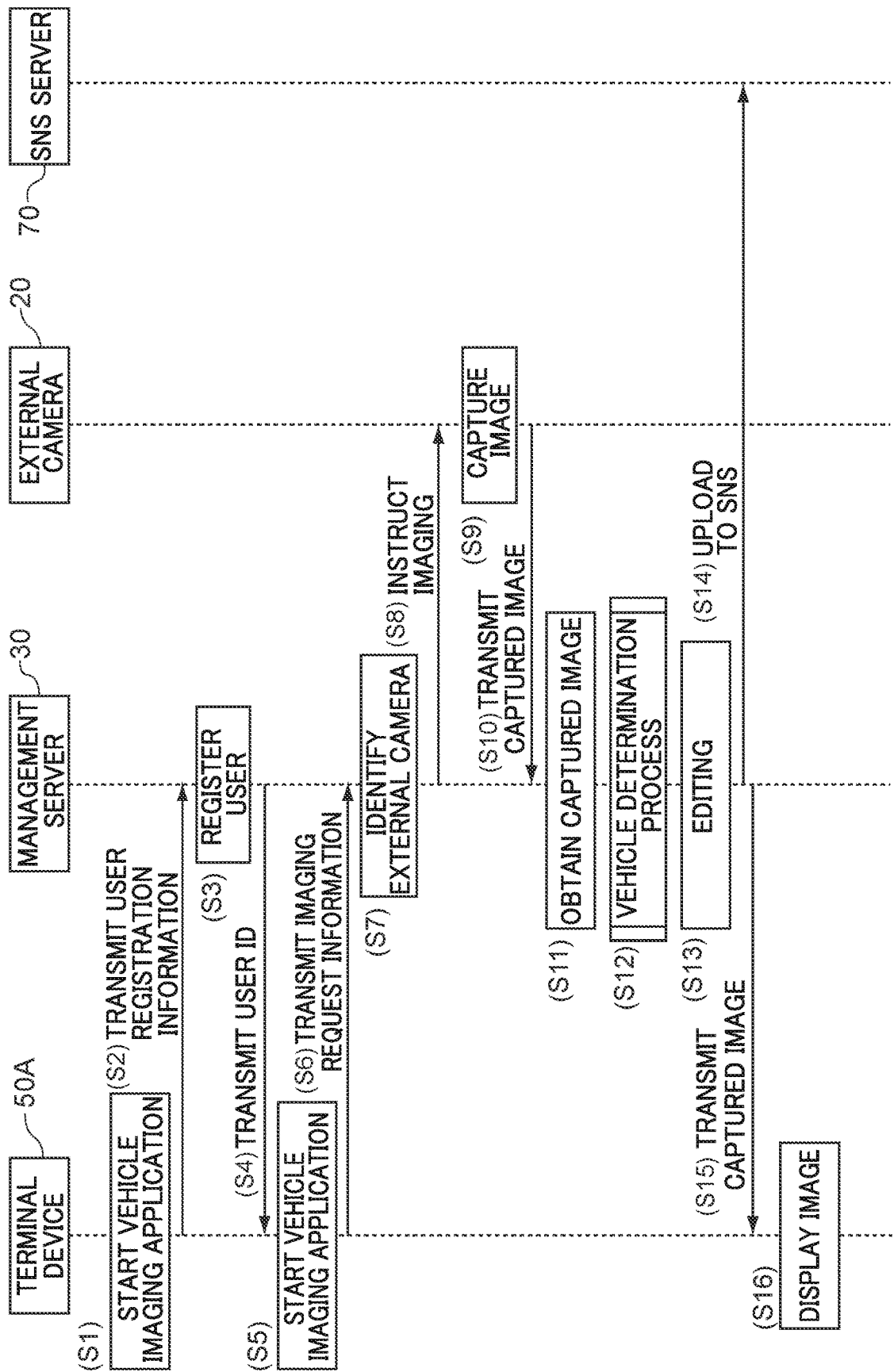
FIG. 11 is a sequence diagram illustrating an example of a process flow performed by a vehicle imaging support processing program and a vehicle imaging application program according to the first embodiment.

Next, the operation of the management server 30 and the terminal device 50A according to the first embodiment will be described with reference to FIG. 11. FIG. 11 is a sequence diagram illustrating an example of a process flow performed by the vehicle imaging support processing program 32A and the vehicle imaging application 52A according to the first embodiment, which are executed by the CPU 31A of the management server 30 and the CPU 51A of the terminal device 50A, respectively.

In step S1 of FIG. 11, the terminal device 50A activates the vehicle imaging application 52A in response to an operation of the occupant of the vehicle 10. The vehicle imaging application 52A displays a user registration screen (not illustrated in the drawings) on the display unit 53, and prompts the occupant to input user registration information. As described above, the user registration information includes a user name representing the occupant of the vehicle 10, a number of the license plate of the vehicle 10, a model of the vehicle 10, and an E-mail address of the occupant.

In step S2, the transmission unit 60 of the terminal device 50A transmits the user registration information inputted from the user registration screen to the management server 30 through the network N1.

In step S3, the registration unit 48 of the management server 30 generates a user ID for the user registration information received by the reception unit 40, and registers the generated user ID and the user registration information into the user registration table 32C illustrated in FIG. 7, for example.

In step S4, the registration unit 48 of the management server 30 performs a process of transmitting the generated user ID to the terminal device 50A through the network N1.

In step S5, the terminal device 50A activates the vehicle imaging application 52A in response to an operation of the occupant of the vehicle 10. The vehicle imaging application 52A displays an imaging request screen, as illustrated in FIG. 12, on the display unit 53, and prompts the occupant to input imaging request information.

FIG. 12 is a front view illustrating an example of the imaging request screen according to the embodiments. As illustrated in FIG. 12, the imaging request screen includes items of a user ID, a present position, a editing on a captured image, an edit menu, and the like. The present position may be automatically acquired using the GPS function of the terminal device 50A. Pattern IDs that may be selected in the edit menu correspond to the pattern IDs that are registered in the edit pattern table 32D illustrated in FIG. 8, for example. In a case in which "YES" is selected in the editing on a captured image, a selection from the edit menu is enabled. In a case in which "NO" is selected in the editing on a captured image, the edit menu is grayed out, and a selection from the edit menu is disabled. After a "SEND" button is pressed in the imaging request screen, the imaging request information inputted from the imaging request screen is transmitted to the management server 30. However, if a "CANCEL" button is pressed in the imaging request screen, no imaging request is issued.

In step S6, the transmission unit 60 of the terminal device 50A transmits the imaging request information, which is inputted from the imaging request screen illustrated in FIG. 12, to the management server 30 through the network N1.

In step S7, the identification unit 41 of the management server 30 identifies the external camera 20 that is able to image the vehicle 10 in a driving state from outside, based on the position of the vehicle 10 included in the imaging request information received by the reception unit 40.

In step S8, the instruction unit 43 of the management server 30 instructs, through the network N1, the external camera 20 identified by the identification unit 41 to image the driving vehicle 10.

In step S9, the external camera 20 performs imaging of the driving vehicle 10, in response to the instruction from the management server 30.

In step S10, the external camera 20 transmits a captured image to the management server 30 through the network N1.

In step S11, the acquisition unit 44 of the management server 30 obtains the captured image from the external camera 20 through the network N1.

In step S12, the determination unit 45 of the management server 30 performs a vehicle determination process in which whether or not the vehicle 10 is present in the captured image obtained in step S11 is determined.

Figure 13:
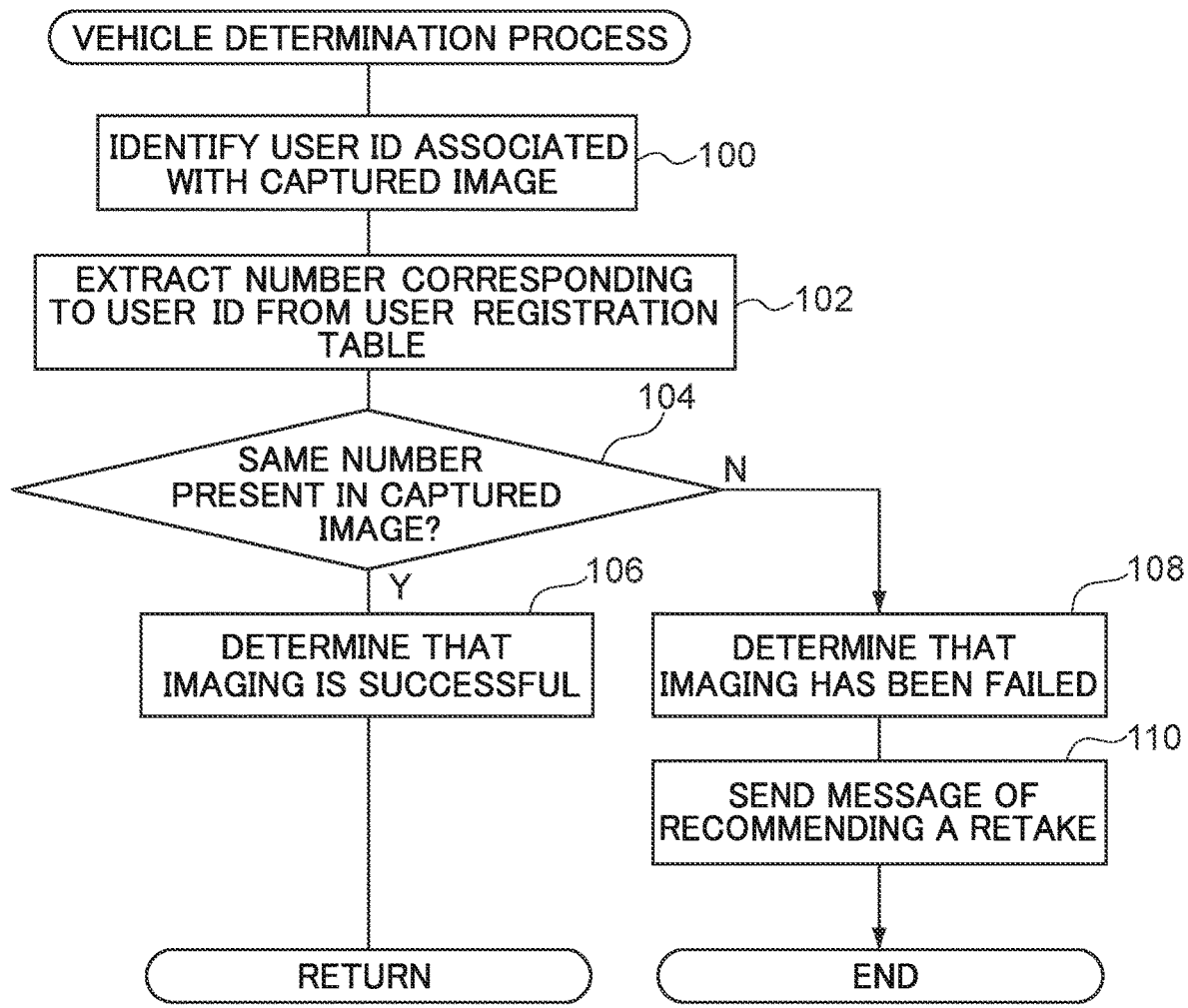
FIG. 13 is a flowchart illustrating an example of a vehicle determination process flow performed by the vehicle imaging support processing program according to the first embodiment.

FIG. 13 is a flowchart illustrating an example of a vehicle determination process flow of the vehicle imaging support processing program 32A according to the first embodiment, which is executed by the CPU 31A of the management server 30.

In step 100 of FIG. 13, the determination unit 45 identifies a user ID associated with the captured image obtained from the external camera 20.

In step 102, the determination unit 45 reads out a number that corresponds to the identified user ID from the user registration table 32C illustrated in FIG. 7, for example.

In step 104, the determination unit 45 determines whether or not the read number is present in the captured image obtained from the external camera 20. If it is determined that the same number is present (i.e., the determination is affirmative), the process proceeds to step 106. If it is determined that the same number cannot be found in the captured image (i.e., if the determination is negative), the process proceeds to step 108.

In step 106, the determination unit 45 determines that the imaging is successful, and the process returns to step S13 of FIG. 11.

In step 108, the determination unit 45 determines that the imaging is unsuccessful, and the process proceeds to step 110.

In step 110, the determination unit 45 performs a process of transmitting a message recommending a retake to the terminal device 50A through the network N1, and the entire process of the vehicle imaging support processing program 32A is ended.

Next, in step S13 of FIG. 11, the edit unit 46 of the management server 30 reads out editing contents that correspond to the pattern ID designated by the imaging request information from the edit pattern table 32D illustrated in FIG. 8, for example, and edits the captured image in accordance with the read editing contents.

In step S14, the uploading unit 47 of the management server 30 performs a process of uploading the captured image after being edited by the edit unit 46, to the SNS server 70 through the network N1.

In step S15, the uploading unit 47 of the management server 30 performs a process of transmitting the captured image, after being edited by the edit unit 46, to the terminal device 50A through the network N1. Then, the entire process of the vehicle imaging support processing program 32A is ended. Note that the order of step S15 and step S14 may be inverted.

In step S16, the reception unit 61 of the terminal device 50A receives the captured image transmitted from the management server 30 in step S15, through the network N. The terminal device 50A displays the received captured image on the display unit 53, and then, the entire process of the vehicle imaging application 52A is ended.

As described above, according to the first embodiment, a captured image of the user's own vehicle during driving may be obtained without a need for any photographers. Furthermore, since the captured image is directly uploaded from the management server to the SNS, the captured image may be immediately viewed by SNS users.

Although in the first embodiment, an example in which the management server 30 is applied as the vehicle imaging support device has been described, even if the terminal device 50A is applied as the vehicle imaging support device, the terminal device 50A may perform a similar process as the management server 30. In this case, the terminal device 50A may be configured to perform at least a part of the functions of the management server 30. For example, the terminal device 50A may include an identification unit that identifies the external camera 20 that is able to image the vehicle 10 in a driving state from outside; a instruction unit that instructs the external camera 20 identified by the identification unit to image the driving vehicle 10; an acquisition unit that obtains an image captured by the external camera 20 in response to the instruction from the instruction unit; and an uploading unit that performs a process of uploading the captured image, obtained by the acquisition unit, to an SNS server 70.

Second Embodiment

In the first embodiment, the captured image is edited in the management server. In the second embodiment, the captured image may also be edited at the terminal device, thus allowing uploading an image that is more preferable for the user to the SNS.

Figure 14:
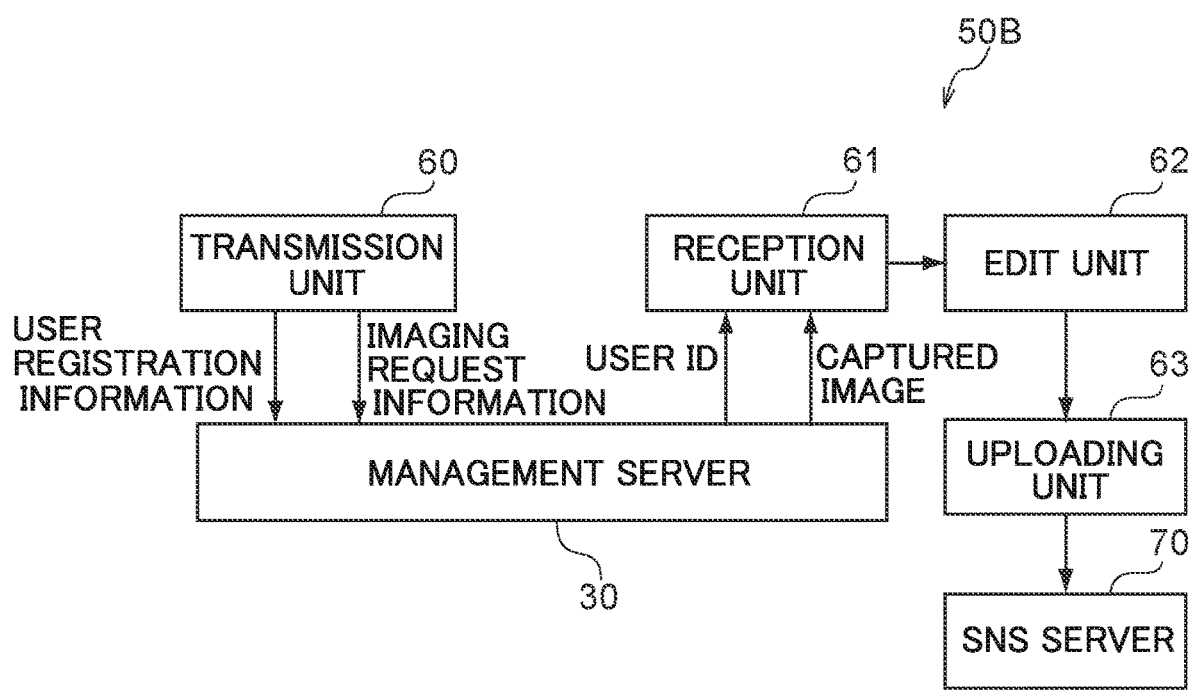
FIG. 14 is a block diagram illustrating an example of the functional configuration of a terminal device according to a second embodiment.

FIG. 14 is a block diagram illustrating an example of the functional configuration of a terminal device 50B according to the second embodiment. As illustrated in FIG. 14, the terminal device 50B includes an edit unit 62 and an uploading unit 63, in addition to the transmission unit 60 and the reception unit 61. The CPU 51A of the terminal device 50B functions as the transmission unit 60, the reception unit 61, the edit unit 62, and the uploading unit 63, by executing the vehicle imaging application 52A. In the second embodiment, components similar to those of the terminal device 50A according to the first embodiment are indicated with the same reference numerals, and repeated description is omitted.

The edit unit 62 according to the second embodiment edits at least one value of a field angle, an angle, or a reproduction speed of a captured image received by the reception unit 61. As this editing process, for example, a process of changing at least one set value of the field angle, the angle, or the reproduction speed is performed in response to an editing operation of the occupant. This editing process may not necessarily performed, and in a case in which the editing process is not performed, the captured image received by the reception unit 61 is directly transmitted to the uploading unit 63 without change.

The uploading unit 63 performs a process of uploading the captured image from the edit unit 62 to the SNS server 70 through the network N1. This uploading may be a manual uploading of the captured image may performed by the occupant, or an automatic uploading.

Next, the operation of the management server 30 and the terminal device 50B according to the second embodiment will be described with reference to FIG. 15. FIG. 15 is a sequence diagram illustrating an example of a process flow performed by a vehicle imaging support processing program 32A and the vehicle imaging application 52A according to the second embodiment, which are executed by the CPU 31A of the management server 30 and the CPU 51A of the terminal device 50B, respectively.

Since steps S21 to S33 of FIG. 15 are the same as steps S1 to S13 of FIG. 11 described above, repeated description thereof is omitted.

In step S34 of FIG. 15, the uploading unit 47 of the management server 30 performs a process of transmitting a captured image to the terminal device 50B through the network N1, and the entire process of the vehicle imaging support processing program 32A is ended.

In step S35, the reception unit 61 of the terminal device 50B receives the captured image that is transmitted from the management server 30 in step S34 through the network N1, and displays the received captured image on the display unit 53.

In step S36, the edit unit 62 of the terminal device 50B edits at least one value of the field angle, the angle, or the reproduction speed of the captured image displayed on the display unit 53. As this editing process, as described above, a process of changing at least one set value of the field angle, the angle, or the reproduction speed is performed in response to an editing operation of the occupant.

In step S37, the uploading unit 63 of the terminal device SOB performs a process of uploading the captured image, after being edited by the edit unit 46, to the SNS server 70 through the network N1, and then the entire process of the vehicle imaging application 52A is ended.

As described above, according to the second embodiment, it is possible to obtain a captured image of a user's own vehicle during driving, without a need for any photographers. Furthermore, the captured image edited in a manner more preferable for the user at the terminal device may be uploaded on the SNS.

The embodiments have been described above using the management server and the terminal devices as examples. However, the present disclosure may be implemented by a program that causes a computer to perform the functions of each of the components included in the management server and the terminal device. The present disclosure may alternatively be implemented by a non-transitory computer readable storage medium that stores this program.

The configurations of the management server and the terminal devices described in the above embodiments are merely examples, and may be changed as circumstances demand, without departing from the scope of the present disclosure.

The process flows of the programs described in the above embodiments are also merely examples, and may be changed as circumstances demands, such that an unnecessary step may be eliminated, a new step may be added, or a process order may be inverted, without departing from the scope of the present disclosure.

The above embodiments describe cases in which the processes according to the embodiments are realized by a software configuration using the computers by executing programs, but the present disclosure is not limited to this. The disclosure may be realized by, for example, a hardware configuration, or a combination of hardware configuration and software configuration.

What is claimed is:

1. A vehicle imaging support device comprising a memory and a processor coupled to the memory, the processor configured to:
   receive a request for imaging a vehicle and a position of the vehicle from a terminal device installed in the vehicle;
   identify an imaging device that is able to image the vehicle in a driving state from outside, based on the position of the vehicle in response to receiving the request;
   transmit, to the vehicle, guide information for guiding the vehicle to a location at which the identified imaging device is installed in response to identifying the imaging device;
   instruct the identified imaging device to capture an image of the vehicle in the driving state;
   obtain the image captured by the imaging device in response to the instruction;
   receive a user ID from the terminal device installed in the vehicle;
   retrieve a number corresponding to the user ID from a registration table stored in the memory;
   determine whether the number is present in the captured image; and
   transmit the captured image to the terminal device installed in the vehicle in response to determining that the number is present in the captured image.

2. The vehicle imaging support device according to claim 1, wherein the processor is further configured to upload the captured image to a predetermined social networking service.

3. The vehicle imaging support device according to claim 2, wherein the processor is further configured to:
   determine whether or not the vehicle is present in the captured image, and
   upload the captured image to the social networking service in a case in which it is determined that the vehicle is present in the captured image.

4. The vehicle imaging support device according to claim 3, wherein the processor is further configured to determine that the vehicle is present in the captured image in a case in which a number of a license plate of the vehicle is present in the captured image.

5. The vehicle imaging support device according to claim 1, wherein the processor is further configured to perform an editing process on the captured image.

6. The vehicle imaging support device according to claim 5, wherein
   the captured image is a moving image, and
   the editing process includes editing at least one value of a field angle, an angle, or a reproduction speed of the moving image.

7. The vehicle imaging support device according to claim 1, wherein the processor is further configured to identify the position of the vehicle by receiving the position of the terminal device that has been carried onto the vehicle and that is able to identify the position of the terminal device itself.

8. A non-transitory storage medium storing a program to cause a computer to execute a vehicle imaging support process, the vehicle imaging support process comprises:
   receiving a request for imaging a vehicle and a position of the vehicle from a terminal device installed in the vehicle;
   identifying an imaging device that is able to image a vehicle in a driving state from outside, based on the position of the vehicle in response to receiving the request;
   transmitting, to the vehicle, guide information for guiding the vehicle to a location at which the identified imaging device is installed in response to identifying the imaging device;
   instructing the identified imaging device to capture an image of the vehicle in the driving state;
   obtaining the image captured by the imaging device in response to the instructing;
   receiving a user ID from the terminal device installed in the vehicle;
   retrieving a number corresponding to the user ID from a registration table stored in the memory;
   determining whether the number is present in the captured image; and
   transmitting the captured image to the terminal device installed in the vehicle in response to determining that the number is present in the captured image.

9. A vehicle imaging support method comprising:
receiving a request for imaging a vehicle and a position of the vehicle from a terminal device installed in the vehicle;
identifying an imaging device that is able to image a vehicle in a driving state from outside, based on the position of the vehicle in response to receiving the request;
transmitting, to the vehicle, guide information for guiding the vehicle to a location at which the identified imaging device is installed in response to identifying the imaging device;
instructing the identified imaging device to capture an image of the vehicle in the driving state;
obtaining the image captured by the imaging device in response to the instructing;
receiving a user ID from the terminal device installed in the vehicle;
retrieving a number corresponding to the user ID from a registration table stored in the memory;
determining whether the number is present in the captured image; and
transmitting the captured image to the terminal device installed in the vehicle in response to determining that the number is present in the captured image.

10. The vehicle imaging support device according to claim 1, wherein the processor is further configured to:
transmit a message recommending a retake to the terminal device installed in the vehicle in response to determining that the number is not present in the captured image.

11. The vehicle imaging support device according to claim 1, wherein the processor is further configured to:
receive a pattern ID from the terminal device installed in the vehicle; and
edit the captured image based on editing contents corresponding to the pattern ID.

12. The non-transitory storage medium of claim 8, wherein the vehicle imaging support process further comprises:
transmitting a message recommending a retake to the terminal device installed in the vehicle in response to determining that the number is not present in the captured image.

13. The non-transitory storage medium of claim 8, wherein the vehicle imaging support process further comprises:
receiving a pattern ID from the terminal device installed in the vehicle; and
editing the captured image based on editing contents corresponding to the pattern ID.

14. The vehicle imaging support method of claim 9, further comprising:
transmitting a message recommending a retake to the terminal device installed in the vehicle in response to determining that the number is not present in the captured image.

15. The vehicle imaging support method of claim 9, further comprising:
receiving a pattern ID from the terminal device installed in the vehicle; and
editing the captured image based on editing contents corresponding to the pattern ID.

* * * * *

UNITED STATES PATENT AND TRADEMARK OFFICE
CERTIFICATE OF CORRECTION

PATENT NO. : 10,757,315 B2
APPLICATION NO. : 16/238096
DATED : August 25, 2020
INVENTOR(S) : Daichi Kusanagi et al.

Page 1 of 1

It is certified that error appears in the above-identified patent and that said Letters Patent is hereby corrected as shown below:

In the Specification

In Column 4, Line(s) 63, after "network", delete "N" and insert --N1--, therefor.

In Column 5, Line(s) 8, delete "(OPS)" and insert --(GPS)--, therefor.

In Column 9, Line(s) 28, after "RAM", delete "SIC" and insert --51C--, therefor.

In Column 9, Line(s) 46, after "network", delete "N" and insert --N1--, therefor.

In Column 11, Line(s) 50, after "network", delete "N" and insert --N1--, therefor.

Signed and Sealed this
Fifth Day of January, 2021

Andrei Iancu
*Director of the United States Patent and Trademark Office*